(12) United States Patent
Adler

(10) Patent No.: US 7,974,527 B1
(45) Date of Patent: Jul. 5, 2011

(54) HOT LIQUID DISPENSER

(76) Inventor: Eitan I. Adler, West Hempstead, NY (US)

( * ) Notice: Subject to any disclaimer, the term of this patent is extended or adjusted under 35 U.S.C. 154(b) by 510 days.

(21) Appl. No.: 12/131,964

(22) Filed: Jun. 3, 2008

(51) Int. Cl.
  *F24H 1/18* (2006.01)
(52) U.S. Cl. .......................... 392/450; 392/463; 99/275
(58) Field of Classification Search .................. 392/450, 392/441, 463
See application file for complete search history.

(56) References Cited

U.S. PATENT DOCUMENTS

| | | | | |
|---|---|---|---|---|
| 4,331,067 A * | 5/1982 | Mysicka et al. | ................. | 99/305 |
| 4,386,556 A * | 6/1983 | Romey, Sr. | ...................... | 99/290 |
| 4,473,003 A * | 9/1984 | Stone, Jr. | ......................... | 99/305 |
| 4,565,121 A * | 1/1986 | Ohya et al. | ....................... | 99/281 |
| 4,984,511 A * | 1/1991 | Sekiguchi | ........................ | 99/287 |
| 5,440,972 A * | 8/1995 | English | ........................... | 99/282 |
| 5,647,055 A * | 7/1997 | Knepler | ........................ | 392/451 |
| 7,043,149 B2 * | 5/2006 | Morimoto et al. | ............ | 392/441 |
| 7,672,576 B2 * | 3/2010 | Grossbach et al. | ........... | 392/463 |
| 7,817,907 B2 * | 10/2010 | Yui | ................................ | 392/450 |
| 2006/0005713 A1 | 1/2006 | Soryas | | |
| 2007/0261561 A1 * | 11/2007 | Grossbach et al. | ............. | 99/275 |
| 2010/0108713 A1 * | 5/2010 | Grossbach et al. | ............... | 222/1 |

\* cited by examiner

*Primary Examiner* — Thor S Campbell
(74) *Attorney, Agent, or Firm* — Michael A. Adler; Davidoff Malito & Hutcher LLP

(57) ABSTRACT

Hot liquid dispenser includes a housing including first and second liquid-retaining chambers, the first chamber being accessible to enable liquid to be placed therein and the second chamber being situated within a closed interior space of the housing. A heating system heats liquid in the first chamber without directly heating liquid in the second chamber. A conduit system allows only a one-way flow of liquid from the first to the second chamber and also prevents formation of a fluid connection between liquid in the first and second chambers. The dispenser includes a dispensing system having an outlet from which liquid placed into the first chamber is dispensed without continuous fluid movement of the liquid from the first chamber through the second chamber to the outlet such that liquid is retained in the second chamber without a fluid connection to the first chamber and without flowing toward the outlet.

20 Claims, 3 Drawing Sheets

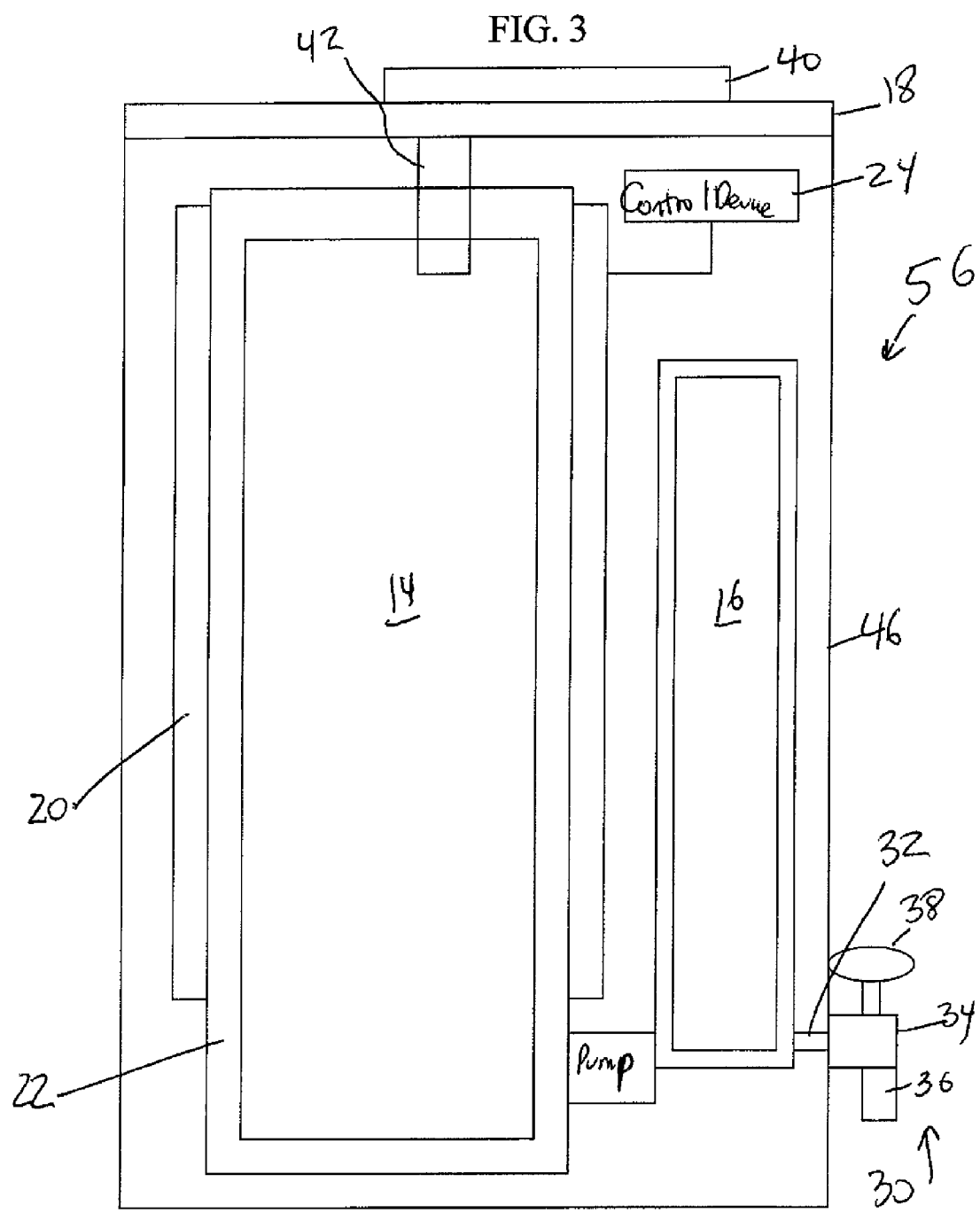

HOT LIQUID DISPENSER

FIELD OF THE INVENTION

The present invention relates generally to a dispenser which maintains a liquid in a heated state and dispenses the heated liquid, and more particularly to a liquid dispenser which heats water, maintains the water in a heated state and enables the hot water to be dispensed for immediate and unrestricted use in accordance with Jewish law by observant Jews on the Sabbath Day.

BACKGROUND OF THE INVENTION

Jewish Law prohibits cooking on the Sabbath Day. The definition of "cooking" is somewhat more stringent for liquids than for solid food and according to most authorities, it is forbidden on the Sabbath Day to heat liquids, most notably water, beyond the temperature of approximately 40° C., and also to use liquids that have been so heated. Thus, heating water to a temperature above 40° C. would constitute "cooking" of the water and the heated water could not be used. On the other hand, liquids that have already reached the temperature of about 40° C. or higher before the onset of the Sabbath (on Sundown of Friday) may be maintained at that temperature and, indeed, the temperature may even be raised without breaking Jewish Law.

Therefore, although heating liquids to a temperature above 40° C. is forbidden, there are various ways to permit the consumption of hot liquids on the Sabbath Day. For example, electric dispensers are available which include a liquid-retaining reservoir or chamber and an electric heating element arranged in connection with the chamber which heats liquid in the chamber. Before the onset of the Sabbath Day, the chamber is filled with liquid, e.g., water, the dispenser is plugged in and the water is heated close to or above its boiling point before the onset of the Sabbath Day. The electric heating element is then controlled to maintain the hot water in its heated state during the Sabbath Day. A pumping mechanism, outflow valve or spigot is connected to the chamber and enables the hot water in the chamber to be dispensed into a vessel when desired.

However, according to Jewish Law, use of the vessel into which the hot water is dispensed directly from this type of prior art dispenser is restricted in that a specific procedure must be undertaken to enable use of the hot water for cooking another substance.

Specifically, according to Jewish Law, the dispenser is considered a "first vessel" (in Hebrew, a Kli Rishon-primary utensil) meaning that the dispenser itself constitutes a heat source. Indeed, the electric heating element heats the wall or walls defining the chamber in the dispenser and since the wall of the chamber thus becomes hot, it provides thermal energy to the liquid in the chamber while the dispenser is operational. This extended heating of the liquid in the chamber via the wall(s) defining the chamber causes the liquid in the chamber to continue to "cook".

While it is permissible to pour hot water from such a "first vessel" into an unheated vessel, e.g., a cup or mug, and then to drink the water therefrom, it is not permissible on the Sabbath Day to pour hot water directly from the "first vessel" into another, unheated vessel for the purpose of cooking food products in this unheated vessel. Thus, water from the "first vessel" may not be poured directly from the dispenser onto food products, such as soup powder, coffee granules and tea, in another, unheated vessel.

Rather, to enable such food products to be "cooked" on the Sabbath Day in accordance with Jewish Law, there is a rule that the water from a hot water dispenser, or other heated source of water, must first be poured into an intermediate, unheated vessel known as a "second vessel" (in Hebrew, a Kli Sheni, or secondary utensil-once removed from the direct heat source), and then, after the water in the "second vessel" is no longer in fluid communication with the heated first vessel, poured into a "third vessel" containing the food products (in Hebrew, a Kli Shlishi, or tertiary utensil-twice removed from the direct heat source).

For example, under Jewish law, one generally accepted method of making hot tea and other hot beverages on the Sabbath Day is to dispense water from an electric hot water dispenser (which would constitute the Kli Rishon) that was previously plugged into an outlet prior to the onset of the Sabbath Day (and filled with water which must also have been heated prior to the onset of the Sabbath Day), dispense the water on the Sabbath Day into a cup or glass (which would thus constitute the Kli Sheni) and thereafter, once the desired amount of water is present in this cup or glass and the outflow from the dispenser is stopped, pour the water from this cup or glass into yet another cup or glass (which would thus constitute the Kli Shlishi). This process is cumbersome and often leads to spilled water and even burn injuries.

Nevertheless, since non-compliance with these rules constitutes an infringement of the Sabbath Laws and since the primary authority for these Laws derives from biblical injunction, orthodox Jews take these laws very seriously.

It would, therefore, be desirable to provide a hot liquid dispenser that has a "second vessel" associated therewith so that water or other liquid dispensed directly from the dispenser is capable of immediately being used by observant Jews to cook food products in accordance with Jewish law.

OBJECTS AND SUMMARY OF THE INVENTION

It is an object of the present invention to provide a new and improved hot liquid dispenser, in particular, one that can be used by observant Jews on the Sabbath Day to dispense a hot liquid that can be used to immediately cook food products in accordance with Jewish law.

In order to achieve this object and possibly others, a hot liquid dispenser in accordance with the invention includes a common housing defining separated first and second liquid-retaining chambers, only the first chamber being accessible to enable liquid to be placed therein, a heating system associated with only the first chamber to heat liquid in the first chamber without heating liquid in the second chamber, and a conduit system arranged to allow only a one-way flow of liquid from the first chamber to the second chamber without allowing flow of liquid from the second chamber to the first chamber. The conduit system is also arranged to prevent formation of a fluid connection between liquid in the first and second chambers. The dispenser also includes a dispensing system having an outlet from which liquid placed into the first chamber is dispensed without continuous fluid movement of the liquid from the first chamber through the second chamber to the outlet such that liquid is retained in the second chamber without a fluid connection to the first chamber and without flowing toward the outlet.

Importantly, since the heating system does not directly heat the second chamber and the liquid remains in the second chamber, the second chamber can constitute a "Kli Sheni" and a vessel placed under the outlet to receive hot liquid from the dispenser would thus constitute a "Kli Shlishi." This vessel would not have any restrictions on the use of the hot liquid, e.g., restrictions relating to the cooking of other food products as described above. Using the dispenser in accordance with the invention, there would no longer be a need, under Jewish law, to pour the hot liquid from the cup, glass or other receptacle which receives the liquid directly from the dispenser into an additional one in order, for example, to make tea on the Sabbath Day without violating any prohibition against cooking.

Of course, the same dispenser could be used by people other than observant Jews to obtain hot liquid and its use by observant Jews on the Sabbath Day should be considered as a motivating reason behind the invention but does not limit the invention in any manner whatsoever.

BRIEF DESCRIPTION OF THE DRAWINGS

For a better understanding of the present invention, reference is made to the following description and accompanying drawings, while the scope of the invention is set forth in the appended claims:

FIG. 3 is a schematic of a third embodiment of a dispenser in accordance with the present invention.

DETAILED DESCRIPTION OF THE INVENTION

Figure 1:
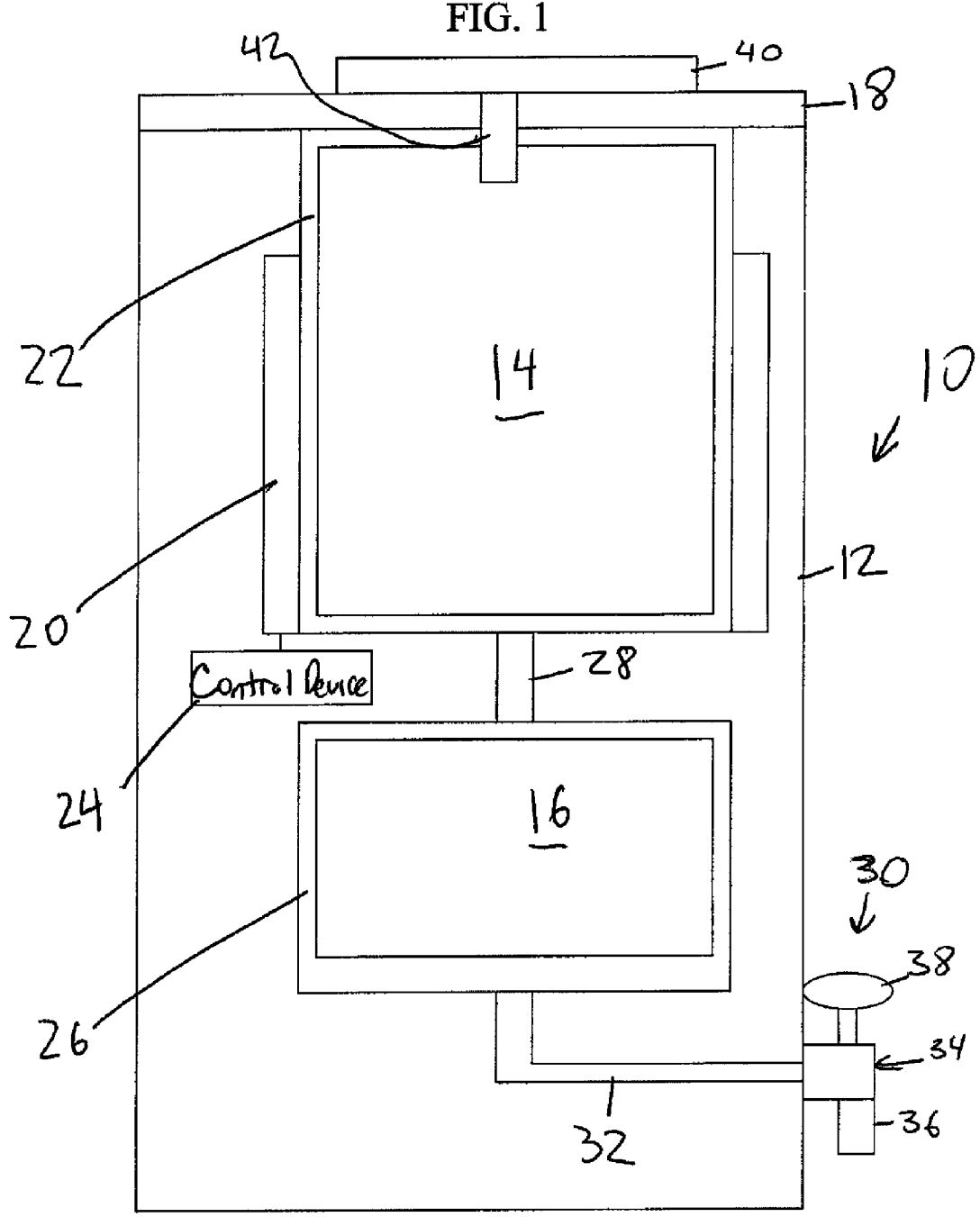
FIG. 1 is a schematic of a first embodiment of a dispenser in accordance with the present invention.

Referring to the accompanying drawings wherein like reference numerals refer to the same or similar elements, FIG. 1 is a schematic of a first embodiment of a dispenser in accordance with the invention which is designated generally as 10. Dispenser 10 includes a housing 12 having a first liquid-retaining chamber 14 and a second liquid-retaining chamber 16. More specifically, the housing 12 defines, contains and/or includes the first and second chambers 14, 16, to the extent that these are interpreted differently. A sealing mechanism, such as one or more O-rings or silicone films, may be provided to seal any opening between the first chamber 14 and second chamber 16.

The housing 12 also includes a lid 18 which is at least partially separable from a remaining portion of the housing 12 to enable access to the first chamber 14, i.e., to enable liquid to be placed into the first chamber 14. Generally, the housing 12 is cylindrical, although other shapes and forms are envisioned, and the chambers 14, 16 are both entirely within the housing 12, i.e., entirely within the interior of the cylindrical periphery of the housing 12. The partial separation of the lid 18 from the remaining portion of the housing 12 may be enabled by a pivot mechanism or other type of mechanism as known to those skilled in the art to which the invention pertains. Further, the first and second chambers 14, 16 are both entirely enclosed within the interior of the housing 12, i.e., covered and inaccessible when the lid 18 is engaged with the remaining portion of the housing 12.

Although FIG. 1 shows the first chamber 14 above the second chamber 16, this is not intended to limit the relative position of the chambers 14, 16. Rather, the first and second chambers 14, 16 may be arranged in any positions within the housing 12 relative to one another, including for example the side-by-side arrangement shown in FIGS. 2 and 3. Also, FIG. 1 shows the second chamber 16 having a smaller volume than the first chamber 14, but the relative volumes can be varied as desired.

A heating element 20 is arranged in the housing 12 in connection with the first chamber 14 and when actuated, heats the liquid in the first chamber 14. More specifically, the heating element 20 may be operative to heat one or more of the walls 22 defining the first chamber 14, so that once the walls 22 are heated, thermal energy is conveyed from the walls 22 to the liquid in the first chamber 14. A thermostat or other temperature measuring device (not shown) may be arranged in the housing 12 to measure the temperature of the liquid in the first chamber 14.

A control device 24 is coupled to the heating element 20 and the temperature measuring device and controls actuation of the heating element 20 to regulate the temperature of the liquid in the first chamber 14. For example, control device 24 may be arranged to maintain the liquid in the first chamber 14 at a predetermined temperature or within a predetermined temperature range, e.g., at or close to about 40° C. The heating element 20 may be actuated when the dispenser 10 is plugged into an outlet via one or more electric cables or cords (not shown) connecting the heating element 20 and/or control device 24 to the outlet. A battery-powered heating element 20 is also envisioned. The construction of the heating system, i.e., the heating element 20, walls 22, control device 24 and temperature-measuring device, would be known to those skilled in the art. Additional features of heating systems in prior art hot liquid dispensers may also be incorporated into a dispenser 10 in accordance with the invention including, for example, LEDs which illuminate to indicate the status of the liquid in the first chamber 14, e.g., whether it is being heated or being maintained in a heated state. Control of such LEDs may also be provided by the control device 24 or by a separate device.

The second chamber 16 is defined by walls 26 which are preferably thermally-insulated or surrounded by thermally insulative material to inhibit cooling of the hot liquid therein. Intentionally, there is no dedicated heating element associated with the second chamber 16, and heating element 20 is constructed to preclude its heating of the liquid in the second chamber 16. Indeed, to enable use of the dispenser 10 by observant Jews on the Sabbath Day, the chamber 16 must not be intentionally heated by a direct heat source, i.e., by the heating element 20 or any other heat source, so that it could constitute a "Kli Sheni". It is possible to even provide structure around the second chamber 16 to prevent such heating from a direct heat source, whether the heating element 10 or another heat source, as well as possibly to prevent indirect and/or unintentional heating from a heat source, if deemed necessary to comply with Jewish law.

A conduit system 28 is arranged in the housing 12 and has an inlet from the first chamber 14 and an outlet to the second chamber 16. Conduit system 28 has a particular function and construction in that it allows only a one-way flow of a liquid from the first chamber 14 to the second chamber 16 and does not allow a fluid connection between liquid in the first chamber 14 and liquid in the second chamber 16. That is, once the liquid is present in the second chamber 16, conduit system 28 not only prevents it from flowing back to the first chamber 14, but also prevents the formation of a fluid connection between the liquids in the first and second chambers 14, 16.

This feature is important to enable use of the dispenser 10 by observant Jews on the Sabbath Day because re-heating of liquid in the second chamber 16 is forbidden and thus if the liquid in the second chamber 16 were to be re-heated, it would frustrate the ability of such Jews to use dispenser in accordance with Jewish Law on the Sabbath Day. Particularly, if liquid in the second chamber 16 were to flow back to the first chamber 14, it would be flowing from an unheated vessel to a heated vessel and thereby would be "cooked" in the heated vessel in violation of Jewish Law and therefore such liquid subsequently dispensed from dispenser 10 could not be used by observant Jews. Similarly, if liquid in the second chamber 16 were to be fluidly connected to liquid in the first chamber 14, there would in essence be a common pool of liquid which is heated by heating element 20, and thus the liquid in the second chamber 16 would again be impermissibly re-heated. In this case, there would also not be a separation between the first and second chambers 14, 16 which would frustrate one of the main purposes of the invention vis-à-vis formation of a heated vessel and an unheated vessel within a common housing, this purpose being described more fully below.

Various constructions of the conduit system 28 are envisioned. For example, the conduit system 28 may comprise a valve, such as a gate valve, a one-way valve, a pipe mechanism, a pumping mechanism, or another type of liquid flow control assembly known in the art. Alternatively, a spring-actuated mechanism or pneumatically-actuated mechanism may regulate a fixed amount of liquid flow from the first chamber 14 into the second chamber 16. In the embodiment wherein the conduit system 28 includes a one-way valve, the one-way valve would be positioned tilted toward the first chamber 14 so that when the dispenser 10 is on a level surface, a ball in the one-way valve rolls into a funnel-shaped seat in order to prevent backflow to the first chamber 14. In the embodiment wherein the conduit system 28 includes a pumping mechanism, the pumping mechanism would be manually actuated to pump a fixed amount of liquid from the first chamber 14 into the second chamber 16. Such a pump would inherently prevent backflow and the formation of a fluid connection between the first and second chambers 14, 16.

A dispensing system 30 is arranged in the housing 12 and associated with the second chamber 16 to enable dispensing of the liquid in the second chamber 16 therefrom. The dispensing system 30 can take various forms, including a conduit 32 and an outlet valve 34 having an outlet 36 and manually activated knob 38 for controlling flow of liquid from the outlet 36, as shown schematically in FIG. 1. Alternatively, the dispensing system 30 may include a spigot or a pumping mechanism.

The dispensing system 30 includes an actuator which interacts with conduit system 28 to allow a flow of liquid from the first chamber 14 into the second chamber 16. The actuator may be a push-button 40 arranged on the lid 18. The manner in which such a push-button 40 can be constructed to interact with conduit system 28, and thereby cause flow out of a liquid-filled chamber, is known to those skilled in the art. Generally, depression of the push-button 40 forces air through a one-way valve 42 into the first chamber 14 causing a volume of liquid in the first chamber 14 to be forced therefrom into conduit system 28.

Dispensing system 30 is designed to ensure the creation of Kli Sheni, i.e., a second, unheated vessel once removed from a direct heat source. To this end, the dispensing system 30 dispenses liquid placed into the first chamber 14 from the second chamber 16 without continuous fluid movement of the liquid from the first chamber 14 to the outlet 36. That is, prior to dispensing from the outlet 36, the liquid must be present in the second chamber 16 without a fluid connection to the first chamber 14 (facilitated by the conduit system 28) and without a fluid connection to the outlet (facilitated when the outlet 36 is closed). Indeed, it is critical that the dispensing system 30 enables a fluid flow control which in one manner of use, prevents fluid in the first chamber 14 from passing directly through the second chamber 14 to the outlet 36 as this would preclude the second chamber 14 from constituting a Kli Sheni. This manner of use may be enabled entirely manually or upon an initial manual action and subsequent automatic actions derived from that manual action.

One way to achieve this objective is to construct the dispensing system 30 to enable its control to allow flow of fluid from the first chamber 14 to the second chamber 16 non-contemporaneously with flow of fluid from the second chamber 16 to the outlet 36. There would thus be a first, discrete flow of liquid from the first chamber 14 to the second chamber 16, possibly manually actuated by depressing push-button 40, and once this first fluid flow is over, the outlet 36 would be opened to allow a second, discrete fluid flow from the second chamber 16 through the outlet 36. The opening of the outlet 36 may be achieved either through a second, manual manipulation of push-button 40 or another control knob on the housing 12 or automatically, for example, derived from the initial depression of the push-button 40 to effect the first fluid flow and based on monitoring of the status of the fluid in the second chamber 16. The time separation between the two fluid flows provides the desired non-continuous fluid movement of the liquid from the first chamber 14 through the second chamber 16 to the outlet 36.

The quantity of liquid that flows from the first chamber 14 into the second chamber 16 may be manually regulated, for example, via a spring-operated closure, or pneumatically triggered. Specifically, the quantity of liquid that flows from the first chamber 14 into the second chamber 16 may be regulated by the duration of time that the push-button 40 is depressed.

In use, the lid 18 is moved to an open position at least partly separated from the housing 12 to expose or otherwise enable access to the first chamber 14 and liquid is placed into the first chamber 14. The lid 18 is then re-engaged with the housing 12 to bring it to its closed position and the dispenser 10 is plugged in. The heating element 20 heats the walls 22 defining the first chamber 14 and, thus, heats the liquid in the first chamber 14. When used by observant Jews for obtaining hot liquid on the Sabbath Day, the dispenser 10 would be plugged in with sufficient time remaining before the onset of the Sabbath Day to ensure that the liquid reached or is close to its boiling point at the onset of the Sabbath Day. This may be indicated by illumination of an LED light on the housing 12.

For use, whether on the Sabbath Day or otherwise, the user depresses the push-button 40 causing a flow of liquid from the first chamber 14 to the second chamber 16. This may be done at any time prior to the time when hot liquid is desired. However, since once the liquid leaves the first chamber 14, it is no longer being heated, but rather its heated state is at most only being maintained by the optional insulation of the second chamber 16, it would be beneficial to depress the push-button 40 only shortly before hot liquid is desired.

When dispensing of the hot liquid from the dispenser 10 is desired, the user places a vessel under the outlet 36 of outlet valve 34 and turns the knob 38 to actuate the outlet valve 34 thereby causing liquid from the second chamber 16 to flow through conduit 32 to the outlet valve 34 and out of the outlet 36 into the vessel.

This vessel which directly receives the hot liquid from outlet 36 is a vessel which is twice removed from the direct heat source, i.e., the heating element 20, and therefore, in accordance with Jewish law, there are no restrictions on the use of this hot liquid, and specifically, no restrictions on the use of the hot liquid in this vessel to cook other substances. The vessel should be considered a Kli Shlishi, wherein the Kli Rishon and Kli Sheni have both been incorporated into the dispenser 10. Thus, dispenser 10 provides tremendous advantages for observant Jews in comparison to prior art electric liquid dispensers since they can easily obtain a hot liquid in a vessel without any cooking restrictions on the liquid and without requiring a cumbersome manual transference of the hot liquid from one vessel to another (as discussed above).

Figure 2:
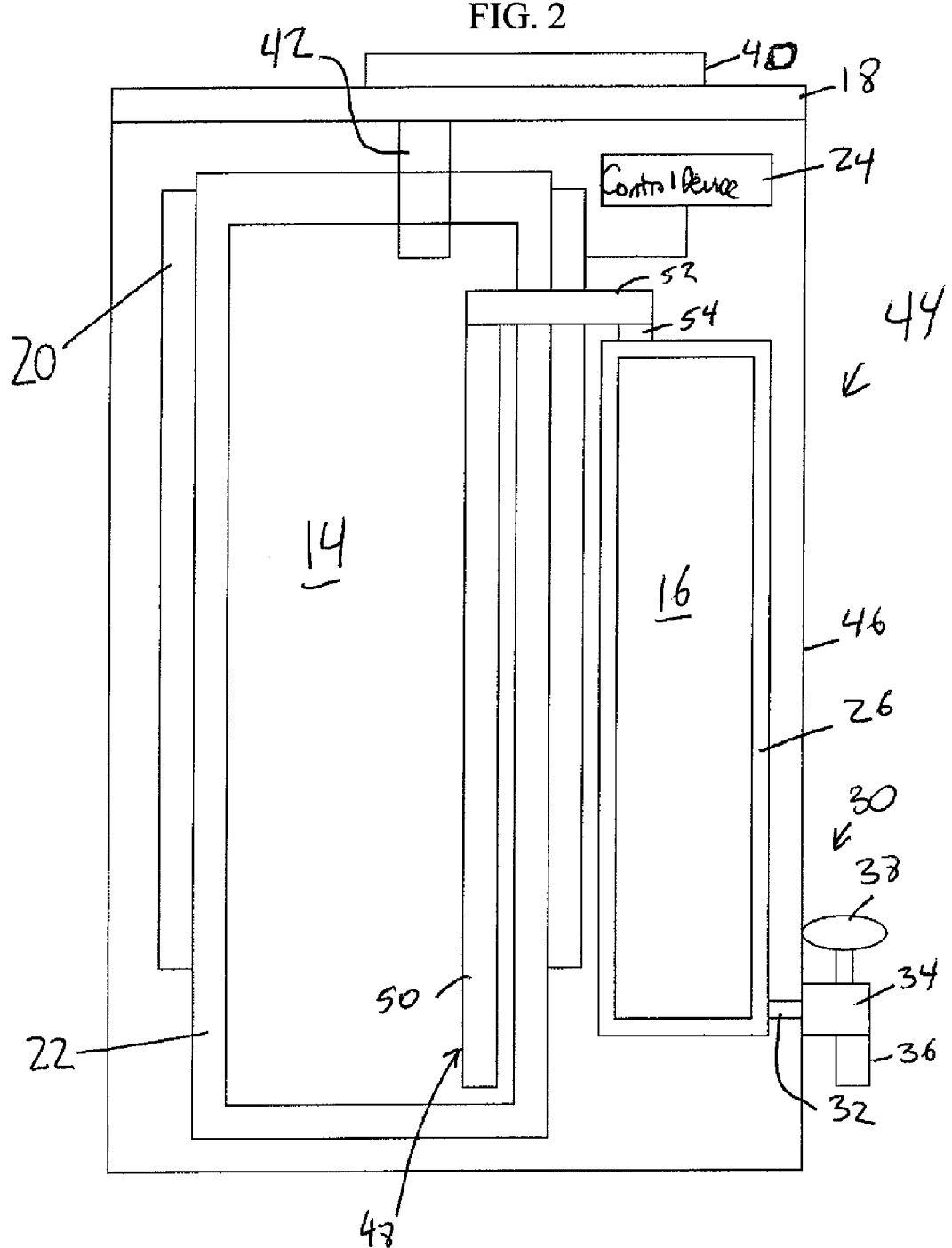
FIG. 2 is a schematic of a second embodiment of a dispenser in accordance with the present invention.

FIG. 2 shows another embodiment of a dispenser designated 42 wherein the same elements of dispenser 10 are designated with the same reference numerals. Dispenser 44 includes a housing 46 in which the first and second chambers 14, 16 are arranged in a side-by-side configuration. A substantially J-shaped conduit 48 is arranged in the housing 46 with the longer elongated portion 50 arranged in the first chamber 14 with an inlet close to the bottom wall defining the first chamber 14. A transverse portion 52 of the J-shaped conduit 48 connects the portion 50 in the first chamber 14 with an elongate portion 54 having an outlet into the second chamber 16. Transverse portion 52 may have an inverted U-shape.

In this embodiment, when the push-button 40 is depressed, air flows through the one-way valve 42 into the first chamber 14 causing a flow of liquid from the first chamber 14 upward through portion 50 of the J-shaped conduit 48, then across the transverse portion 52 and then out through portion 54 into the second chamber 16. The J-shaped conduit 48, in view of its inverted J-shape, inherently prevents backflow of liquid from the second chamber 16 to the first chamber 14, and would also be dimensioned or otherwise constricted to prevent formation of a common pool of liquid including the first and second chambers 14, 16. If necessary, a valve may be arrange din the J-shaped conduit 48 to ensure that there is no backflow of liquid from the second chamber 16 to the first chamber 14.

FIG. 3 shows another embodiment of a dispenser designated 56 wherein the same elements of dispenser 44 are designated with the same reference numerals. Instead of a J-shaped conduit 48, dispenser 56 includes a pump 58 as conduit system 28 which pumps liquid from the first chamber 14 to the second chamber 16 while both preventing flow of liquid from the second chamber 16 to the first chamber 14 and preventing formation of a fluid connection between the liquid in the first and second chambers 14, 16.

Housing 12, 46 may also include one or more windows through which the quantity of liquid in the first chamber 14 and/or second chamber 16 may be viewed.

The dispensers 10, 44, 56 described above rely on separate manual movements to enable liquid to be dispensed therefrom, i.e., depression of the push-button 40 to cause flow of liquid from the first chamber 14 into the second chamber 16 and then the subsequent turning of the knob 38 to cause flow of liquid from the second chamber 16 into a vessel below the outlet valve 34. It is envisioned that a dispenser may be constructed to enable a single manual movement to cause both flow of liquid from the first chamber 14 into the second chamber B and then flow of liquid from the second chamber 16 into a vessel below the outlet valve 34. In this case, the liquid would have to remain in the second chamber 16 for a minimum duration of time (and thereby avoid a continuous flow of liquid from the first chamber 14 through the second chamber 16 and through the outlet 36 of the outlet valve B) to enable this second chamber 16 to constitute a Kli Sheni and thus allow unrestricted use of the liquid being dispensed from outlet valve 34 by observant Jews on the Sabbath Day. The minimum duration of time may simply be an amount of time sufficient for the liquid flowing from the first chamber 14 to be completely in or entirely within the second chamber 16.

While the foregoing description and drawings represent the preferred embodiment of the present invention, it will be understood that various changes and modifications may be made without departing from the spirit and scope of the present invention.

From the above description on the general concept, features and working principles of the invention and its specific embodiments, it would be obvious to a person skilled in the art that there are many variations and alternative embodiments that may be used in substitution of the aforesaid parts, materials, steps or processes. Many of the various parts, components, materials and alternative configurations or embodiments that are not specifically described herein may be used to effectively work the concept and working principles of this invention. They are not to be considered as departures from the present invention but shall be considered as falling within the letter and scope of the following claims.

What is claimed is:

1. A liquid dispenser, comprising:
a common housing including a first liquid-retaining chamber and a second liquid-retaining chamber, said first chamber being accessible to enable liquid to be placed therein and said second chamber being situated within a closed interior space of said housing;
a heating system arranged in said housing and associated with only said first chamber to heat liquid in said first chamber, said second chamber not being directly heated by said heating system, being thermally insulated to prevent indirect heating by said heating system and not being intentionally heated by any other heating system such that the liquid is heated only when in said first chamber;
a conduit system arranged in said housing to allow only a one-way flow of liquid from said first chamber to said second chamber without allowing flow of liquid from said second chamber to said first chamber, said conduit system also being arranged to prevent formation of a fluid connection between liquid in said first and second chambers; and
a dispensing system having an outlet from which liquid placed into said first chamber is dispensed, said second chamber being fluidly coupled only to said first chamber and said outlet such that said second chamber receives fluid only from said first chamber and provides fluid only to said outlet, said outlet receiving fluid only from said second chamber.

2. The dispenser of claim 1, wherein said conduit system comprises a conduit having a first inlet portion arranged to receive liquid from said first chamber and a second outlet portion arranged to release liquid from said conduit into said second chamber, said conduit being arranged to prevent inflow of liquid from said second chamber into said conduit.

3. The dispenser of claim 2, wherein said conduit is substantially J-shaped and has a first elongate portion extending into said first chamber, a second portion opening into said second chamber and a transverse portion extending between said first and second portions.

4. The dispenser of claim 1, wherein said first and second chambers are arranged vertically spaced apart from one another in said housing or side by side in said housing.

5. The dispenser of claim 1, wherein said conduit system comprises a pump arranged to pump liquid from said first chamber to said second chamber while preventing backflow of liquid from said second chamber to said first chamber.

6. The dispenser of claim 1, wherein said dispensing system comprises a manually activated outlet valve.

7. The dispenser of claim 1, wherein said dispensing system includes an actuator which interacts with said conduit system to allow the flow of liquid from said first chamber into said second chamber.

8. The dispenser of claim 1, wherein said heating system comprises a heating element associated with one or more walls defining said first chamber and a control system for controlling said heating element to regulate the temperature of liquid in said first chamber.

9. The dispenser of claim 1, wherein said second chamber is defined by one or more thermally-insulated walls.

10. The dispenser of claim 1, wherein said housing comprises a lid having an open position in which said first chamber is accessible and a closed position in which said first chamber is closed, whereby liquid can be placed into said first chamber when said lid is in its open position.

11. The dispenser of claim 10, wherein said first and second chambers are entirely enclosed within said housing when said lid is in its closed position.

12. A liquid dispenser, comprising:
   a common housing including a first liquid-retaining chamber and a second liquid-retaining chamber, said first chamber being accessible to enable liquid to be placed therein and said second chamber being situated within a closed interior space of said housing;
   heating means arranged in said housing for heating liquid in only said first chamber and not in said second chamber, said second chamber thus not being directly heated by said heating means, being thermally insulated to prevent indirect heating by said heating means and not being intentionally heated by any other heating system such that the liquid is heated only when in said first chamber;
   conduit means arranged in said housing for allowing only a one-way flow of liquid from said first chamber to said second chamber and for preventing formation of a fluid connection between liquid in said first and second chambers; and
   dispensing means for dispensing liquid placed into said first chamber chamber to an outlet of said dispensing means, said second chamber being fluidly coupled only to said first chamber and said outlet such that said second chamber receives fluid only from said first chamber and provides fluid only to said outlet, said outlet receiving fluid only from said second chamber.

13. The dispenser of claim 12, wherein said conduit means comprises a conduit having a first inlet portion arranged to receive liquid from said first chamber and a second outlet portion arranged to release liquid from said conduit into said second chamber, said conduit being arranged to prevent inflow of liquid from said second chamber into said conduit.

14. The dispenser of claim 12, wherein said conduit means comprise pump means for enabling pumping of liquid from said first chamber to said second chamber while preventing backflow of liquid from said second chamber to said first chamber.

15. The dispenser of claim 12, wherein said dispensing means comprise a manually activated outlet valve defining said outlet.

16. The dispenser of claim 12, wherein said dispensing means include an actuator which interacts with said conduit means to allow the flow of liquid from said first chamber into said second chamber.

17. A liquid dispenser, comprising:
   a common housing including a first liquid-retaining chamber and a second liquid-retaining chamber, said first chamber being accessible to enable liquid to be placed therein and said second chamber being situated within a closed interior space of said housing;
   a heating system arranged in said housing and associated with only said first chamber to heat liquid in said first chamber, said second chamber not being directly heated by said heating system, being thermally insulated to prevent indirect heating by said heating system and not being associated with a direct heat source such that the liquid is heated only when in said first chamber;
   a conduit system arranged in said housing to allow only a one-way flow of liquid from said first chamber to said second chamber and prevent formation of a fluid connection between liquid in said first and second chambers; and
   a dispensing system having an outlet from which liquid placed into said first chamber is dispensed, said dispensing system being controllable to allow flow of fluid from said first chamber to said second chamber non-contemporaneously with flow of fluid from said second chamber to said outlet, said second chamber being fluidly coupled only to said first chamber and said outlet such that said second chamber receives fluid only from said first chamber and provides fluid only to said outlet, said outlet receiving fluid only from said second chamber.

18. The dispenser of claim 17, wherein said conduit system comprises a conduit having a first inlet portion arranged to receive liquid from said first chamber and a second outlet portion arranged to release liquid from said conduit into said second chamber, said conduit being arranged to prevent inflow of liquid from said second chamber into said conduit.

19. The dispenser of claim 17, wherein said conduit system comprises a pump arranged to pump liquid from said first chamber to said second chamber while preventing backflow of liquid from said second chamber to said first chamber.

20. The dispenser of claim 17, wherein said dispensing system comprises a manually activated outlet valve or an actuator which interacts with said conduit system to allow the flow of liquid from said first chamber into said second chamber.

* * * * *